(12) United States Patent
Carrera Arenas et al.

(10) Patent No.: US 9,403,349 B2
(45) Date of Patent: Aug. 2, 2016

(54) HEAT WELDING SYSTEM AND METHOD

(71) Applicant: AGROQUÍMICOS DE LEVANTE, S.A., Valencía (ES)

(72) Inventors: Antonio Carrera Arenas, Valencía (ES); Emilio José Garijo Sanchez, Valencía (ES)

(73) Assignee: AGROQUÍMICOS DE LEVANTE, S.A., Valencía (ES)

( * ) Notice: Subject to any disclaimer, the term of this patent is extended or adjusted under 35 U.S.C. 154(b) by 1 day.

(21) Appl. No.: 14/413,112

(22) PCT Filed: Jul. 3, 2013

(86) PCT No.: PCT/ES2013/070463
§ 371 (c)(1),
(2) Date: Jan. 6, 2015

(87) PCT Pub. No.: WO2014/006255
PCT Pub. Date: Jan. 9, 2014

(65) Prior Publication Data
US 2015/0151523 A1  Jun. 4, 2015

(30) Foreign Application Priority Data
Jul. 6, 2012 (ES) .................................. 201231067

(51) Int. Cl.
*A01G 13/02* (2006.01)
*B29C 65/00* (2006.01)
(Continued)

(52) U.S. Cl.
CPC ........ *B32B 37/0076* (2013.01); *A01G 13/0287* (2013.01); *B29C 65/10* (2013.01);
(Continued)

(58) Field of Classification Search
CPC ..................... A01G 13/0287; B29C 66/81465; B29C 66/1112; B29C 66/435; B32B 37/0076; Y10T 156/1064; Y10T 156/17
See application file for complete search history.

(56) References Cited

U.S. PATENT DOCUMENTS

| 3,139,847 | A | | 7/1964 | Bucher et al. |
| 4,050,972 | A | * | 9/1977 | Cardinal, Jr. ....... A01G 13/0287 |
| | | | | 156/308.2 |

(Continued)

FOREIGN PATENT DOCUMENTS

| EP | 0226883 A2 | 7/1987 |
| ES | 8607690 A1 | 11/1986 |

(Continued)

OTHER PUBLICATIONS

Search Report by Spanish patent office dated Jul. 5, 2013.
International Search Report and Written Opinion by European Patent Office on Nov. 28, 2013.

*Primary Examiner* — Mark A Osele
*Assistant Examiner* — Christopher C Caillouet
(74) *Attorney, Agent, or Firm* — Michael B. Fein; Eckert Seamans Cherin & Mellott, LLC

(57) ABSTRACT

The present invention relates to a heat welding system comprising a dispenser for dispensing coverings, at least one structure (1) with coupling means (4) for coupling to a traction vehicle, where said structure (1) comprises a heat welding device (3) for adhering the overlapped longitudinal edges of adjacent coverings to one another, and having coupling means (4) for coupling said heat welding device (3) to the structure (1).

The present invention also relates to the use of said heat welding system which comprises the steps of:
  (i) deploying the means for preparing the terrain arranged on the sides of a structure linked to a traction vehicle;
  (ii) starting the vehicle in one direction and initiating the system;
  (iii) retracting the means of phase (i) from one side and deploying a heat welding device (3) on said side;
  (iv) actuating the system in the direction opposite that of phase (ii);
  (v) repeating phases (iii) and (iv) intercalating the means and devices of both sides as many times as necessary.

15 Claims, 6 Drawing Sheets

(51) Int. Cl.
*B32B 37/00* (2006.01)
*A01G 13/00* (2006.01)
*B29C 65/10* (2006.01)
*B32B 37/20* (2006.01)
*B32B 38/00* (2006.01)
*B29L 31/00* (2006.01)

(52) U.S. Cl.
CPC ........... *B29C66/1122* (2013.01); *B29C 66/435* (2013.01); *B29C 66/8163* (2013.01); *B29C 66/8182* (2013.01); *B29C 66/81463* (2013.01); *B29C 66/81465* (2013.01); *B29C 66/81469* (2013.01); *B29C 66/8362* (2013.01); *B29C 66/86521* (2013.01); *B32B 37/0046* (2013.01); *B32B 37/20* (2013.01); *B32B 38/0004* (2013.01); *B29L 2031/70* (2013.01); *B32B 2410/00* (2013.01); *Y10T 156/1064* (2015.01); *Y10T 156/17* (2015.01)

(56) References Cited

U.S. PATENT DOCUMENTS

| | | | |
|---|---|---|---|
| 4,440,588 A | | 4/1984 | Stevenson et al. |
| 4,771,570 A | * | 9/1988 | Nyboer ................ A01G 13/025 111/160 |
| 6,558,079 B1 | * | 5/2003 | Kozak ..................... B09B 1/004 405/129.15 |
| 8,535,461 B1 | * | 9/2013 | Godbehere ....... B29C 66/86521 111/118 |

FOREIGN PATENT DOCUMENTS

| | | |
|---|---|---|
| ES | 2008798 A6 | 8/1989 |
| JP | H05-76250 A | 3/1993 |
| JP | H07-31298 A | 2/1995 |
| JP | H08-298883 A | 11/1996 |
| JP | H11-151060 A | 6/1999 |

\* cited by examiner

HEAT WELDING SYSTEM AND METHOD

CROSS-REFERENCE TO RELATED APPLICATIONS

This application is a national stage of PCT/ES2013/070463 filed Jul. 3, 2013which claimed priority from Spanish application No. P201231067 filed Jul. 6, 2012. Said applications are hereby incorporated by reference.

OBJECT OF THE INVENTION

The invention relates to a heat welding system for plastic fabrics or coverings particularly applicable in the agricultural sector, and more specifically applicable in those farmlands which are sealed by means of plastic coverings after applying fumigation treatments in an attempt to eliminate parasitic animals, as well as fungi and bacteria, seeking the trend to optimize the subsequent cultivation of the terrain to the greatest extent possible.

More specifically, said heat welding system primarily consists of a heat welding device integrated in a structure pulled by an agricultural machine or vehicle of the types which incorporate reels of sealing means for sealing the ground by means of a polymer covering which is deployed on the terrain and allows trapping a gas or a fumigating substance between said polymer film and the section of terrain for soil disinfection, such that the section of terrain is sealed and the spread of the fumigating substance is prevented, thus allowing the prolongation of the application period thereof on the terrain, increasing its effectiveness and preventing the substance from leaking out, thus reducing or preventing environmental pollution when the agricultural vehicle is working and in the direction of travel thereof.

BACKGROUND OF THE INVENTION

One of the unwanted complications in the agricultural sector today is the low efficiency when it comes to covering a section of terrain to which a fumigation treatment is applied and which is covered by means of coverings such as those mentioned above due to the fact that the vehicles of the current state of the art do not incorporate a heat welding device which allows the reliable sealing of the longitudinal edges of adjacent coverings, there consequently being risks of the fumigating substances leaking out into the environment.

Patent application document ES 2008798 (A6) corresponding to the same applicant describes the current technique for applying the type of coverings mentioned above, consisting of unwinding coverings and the vehicle of which does not comprise heat welding devices, which leads to the problem described above.

In some other cases, the system for unwinding the covering cooperates with mechanized adhesion means arranged in the vehicle, but these means relate to a glue or the like, which due to terrain irregularities and protrusions, the coverings peel off at several points, increasing the risks of environmental pollution and the final intervention of a considerable number of operators manually solving the gluing deficiencies therefore being necessary, thus falling into an increased operating cost without presenting an efficient and integrated system.

Therefore according to the foregoing, the inventions known until now in the state of the art perform the function of the object of invention but in a less reliable and less versatile manner because they fail to perform the function of deploying and sealing or unwinding the covering on the section of terrain to be disinfected in a single step, in addition to having the drawbacks of possible environmental pollution due to sealing deficiencies, health risks for the operator due to the unnatural positions to be adopted to perform the adhesion, as well as an increase in the time for performing the target operation and a cost increase due to the need to perform rather unreliable manual tasks that require strict supervision.

DESCRIPTION OF THE INVENTION

The present invention relates to a heat welding system that overcomes the drawbacks mentioned above, since it has a structure consisting of a frame or chassis that can be coupled to a traction vehicle such as an agricultural vehicle or tractor such that when the fumigating substance is applied on the ground and the covering is deployed, unwound from the reel, and gradually positioned on said terrain as the vehicle moves, it allows performing the function of sealing one of the sides of the covering superimposed on another already positioned side for sealing by means of heat welding, while the other side which is located on the terrain and is not in contact with any other section of the already located covering is gradually fitted into the terrain, leaving it prepared for superimposing another side of the next section of covering to be placed, thus offering the ability to perform the entire activity of preparing the terrain for disinfection, deploying coverings and sealing them in a single step when the traction vehicle is working, without needing extra action by operators performing tedious manual labors, thus considerably reducing the operation time, operation cost, the risks of peeling off, greater durability of the effects sought, and reducing or completely preventing environmental pollution.

Specifically, the system preferably comprises a dispenser for dispensing coverings allowing the overlapped positioning thereof between adjacent coverings, at least one structure with coupling means which allow coupling said structure to a traction vehicle, where said structure comprises at least one heat welding device allowing the overlapped longitudinal edges of adjacent coverings to adhere to one another, and having coupling means which allow coupling said heat welding device to the structure.

The possibility of the heat welding system comprising two heat welding devices is contemplated where a first heat welding device is located in a first outer section of the structure and a second heat welding device is located in a second outer section of the structure, such that it allows using one of the sides to perform heat welding and the other side of the structure to place the side of the covering which will be overlapped by another side of a contiguous covering.

The possibility of the heat welding devices each comprising at least one heating element heating the air coming from a fan, and heating and applying or distributing the hot airflow on the overlapped section, a plurality of rolling means suitable for rolling over the longitudinal edges or sides of the overlapped coverings, and air conduction means through which the air from the fan circulates, is contemplated.

The possibility of the structure comprising furrow opening means for housing the edges of the polymer covering, insertion means for inserting the longitudinal edges of the coverings into the furrows, return means for covering the sides with the specific amount of soil for keeping the side of the covering in place, tamping means for tamping the soil aligned with the heat welding device to improve the sealing, and coating means which allows removing and depositing the necessary amount of polymer covering, is contemplated.

The possibility of the at least two heating elements being located separated from the lower surface of the rolling means where said surface contacts the ground is contemplated, such that the optimum distance between the heat source for welding and the distance from the covering extended on the ground is maintained.

The possibility of the heating elements arranged in the heat welding devices comprising respective height adjustment means which allow the adjustment thereof depending on the typology of the terrain on which the operation will be performed, such as sandy or clayey terrains, is contemplated.

The possibility of the heat welding devices comprising height leveling means for leveling the height of the assembly thereof with respect to the structure, preferably consisting of hydraulic arms is contemplated.

The possibility of the structure comprising at least one ventilation means connected to at least one heating element such that it allows directing air to said heating element is contemplated. The energy is preferably harnessed from the electromotive elements of the traction vehicle itself powering the fan distributing the air to the heating elements which apply the hot airflow on the overlapped section of the longitudinal edges of the coverings.

The possibility of each at least one heat welding device comprising isolating means which allow preventing hot air from leaking out when heat welding the coverings and of these isolating means being located in the space existing between the rolling means of each of the at least one heat welding devices is contemplated.

The possibility of the coating means comprising a reel of polymer material covering which allows unwinding the polymer covering while the system moves forward is contemplated.

The possibility of the furrow opening means, the return means and the insertion means comprising swing means for swinging with respect to the structure, which allow disabling these elements for alternating the outer side of the vehicle that will be required due to comfort depending on the occasions is contemplated.

The possibility of the at least one heat welding devices comprising side swing or retracting means for swinging or retracting with respect to the structure preferably consisting of hinges, enabling the side movement thereof outside the radius of action for sealing the edges of the coverings, is contemplated.

The possibility of the furrow opening means and the return means each having a saucer-shaped section, i.e., a flattened section, in at least one of their ends which allows performing the function, being oriented with a certain angle with respect to the direction of vehicle movement, producing a "blade effect", is contemplated.

The possibility of each of the at least one heating elements of the heat welding devices being linked to at least one pivoting means which allows compensating for terrain irregularities during the heat welding operation, is contemplated.

A second aspect of the invention relates to a heat welding method whereby the coverings extended over the ground can be sealed, preferably comprising the steps of:

(i) deploying furrow opening means, insertion means which allow inserting the edges of the coverings into the furrows and return means corresponding to a first and second side of the system for preparing a first covering on the ground, as well as unwinding said first covering arranged in coating means;

(ii) starting the traction vehicle which pulls the system in one direction and initiating the system, the furrow opening means, insertion means, return means and coating means described in the preceding phase acting on the terrain;

(iii) after a first pass and the first section of the ground is covered by a covering duly extended thereon by means of phases (i) and (ii), vehicle movement is stopped, the means of phase (i) on the first side of the system are retracted except for the coating means, and a heat welding device comprising heating elements present on said first side is deployed, keeping the furrow opening means, the insertion means, the return means of the second side deployed;

(iv) turning the traction vehicle, changing the direction of travel to that opposite the direction indicated in phase (ii), a second covering being extended adjacent to the first covering with the longitudinal edges of both coverings overlapping one another and the heat welding device described in phase (iii) acting on these coverings, while the furrow opening means, the insertion means for inserting the edges and the return means act on the opposite longitudinal edge of said second covering leaving the longitudinal edge thereof prepared on the terrain;

(v) repeating phases (iii) and (iv) as many times as necessary to extend and prepared coverings on the ground, adhering or sealing the longitudinal edges of as many adjacent coverings (17) as required for the expanse of ground, intercalating the retraction and deployment of the heat welding devices and of the means for preparing the coverings on the terrain arranged on the first and second side of the system.

The possibility of the heat welding method, whereby the coverings can be adhered, welded or sealed on the ground, comprising actuating the heat welding device arranged on the side opposite the heat welding device selected in steps (iii) and (iv) is contemplated.

The possibility of the heat welding method, whereby the coverings can be adhered, welded or sealed on the ground, comprising in steps (iii) (iv) or (v), the step of feeding the heating elements present in the heat welding devices through a fan is contemplated.

Therefore, according to the described invention, the system proposed by the invention is an improvement of ground sealing systems used until now and solves in a completely satisfactory manner the problems mentioned above, consisting of replacing the use of machinery and vehicles that require complex, rather inefficient and risky methods, this being done in a simple manner with the subsequent cost reduction due to process optimization and efficiency, all through a simple design that is easy to use and does not require the skill of a trained operator.

DESCRIPTION OF THE DRAWINGS

To complement the description that is being made and for the purpose of better understanding the features of the invention according to a preferred practical embodiment thereof, a set of drawings is attached as an integral part of said description where the following has been depicted with an illustrative and non-limiting character.

PREFERRED EMBODIMENT OF THE INVENTION

Figure 1:
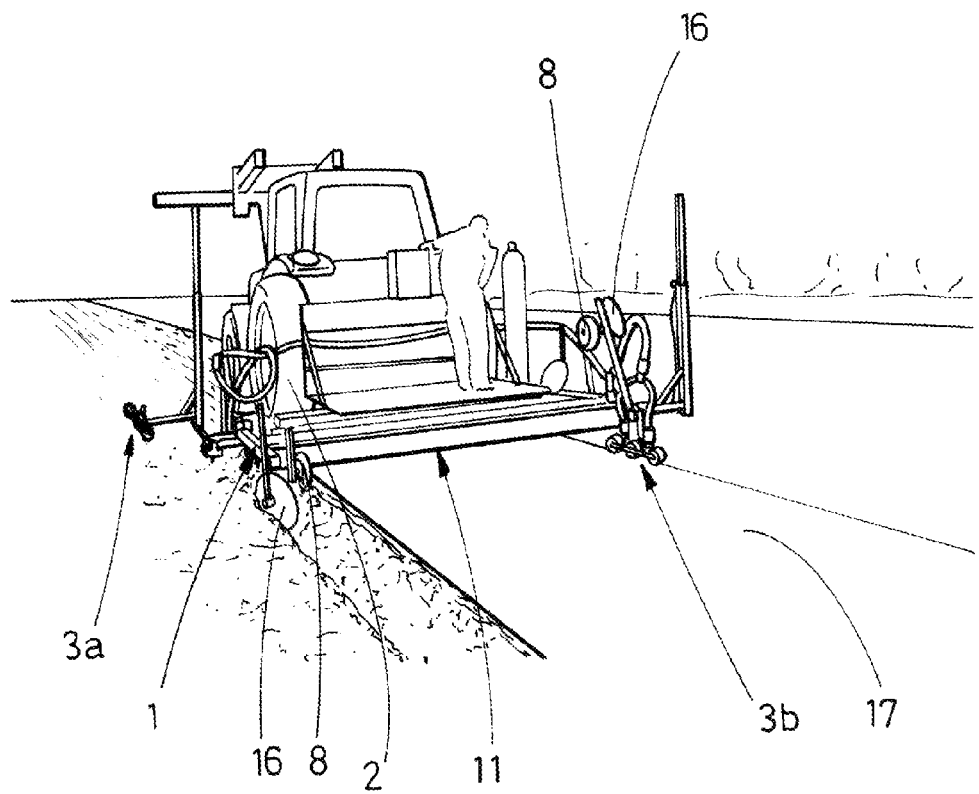
FIG. 1 shows a general view of the complete heat welding system where the structure is coupled to a traction vehicle and the heat welding device is coupled to said structure, where part of the operation of placing the covering on the terrain can be seen.

In view of the described drawings, it can be observed how in one of the possible embodiments of the invention the heat welding system, as seen in FIG. 1, is primarily formed by three defined portions, i.e., a structure (1) which is coupled through coupling means (not depicted), preferably flat bars cooperating with pins, to a traction vehicle, preferably a tractor with movement means (2), preferably wheels, responsible for pulling the structure (1) and moving it over the terrain to be covered or sealed by means of coverings (17), and finally two sealing devices (3a and 3b) preferably located on the outer sides of the vehicle.

Figure 2:
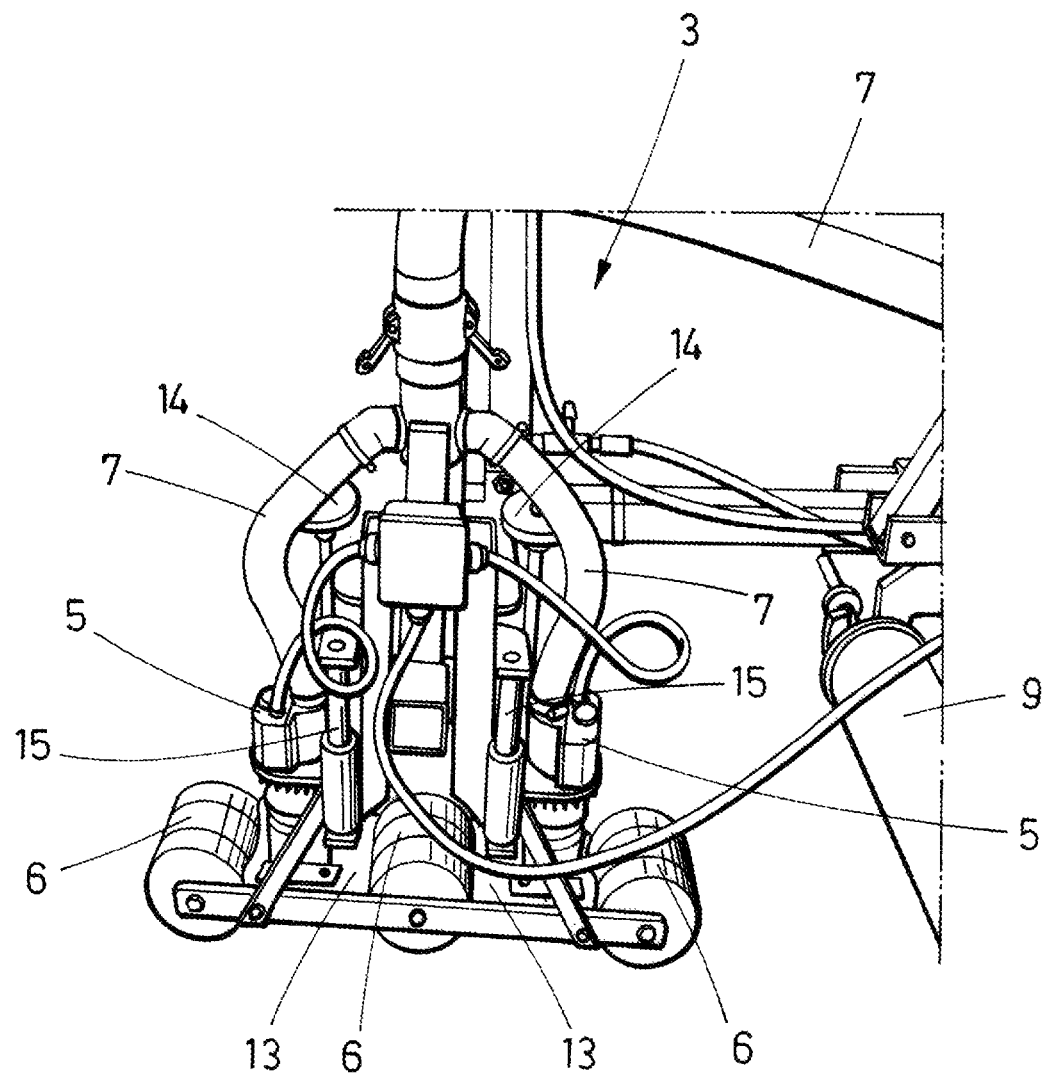
FIG. 2 shows a front view of one of the two heat welding devices.
Figure 3:
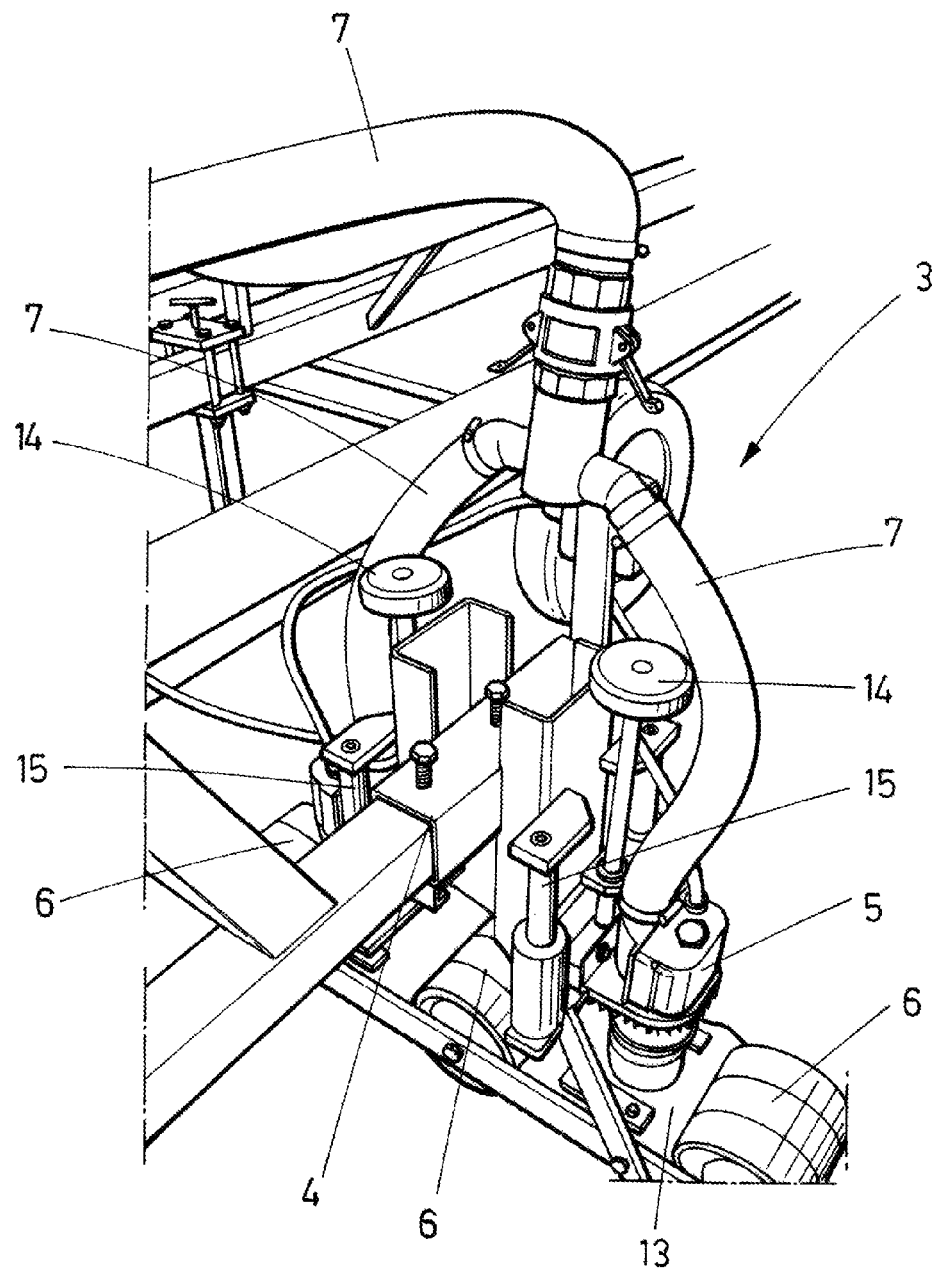
FIG. 3 shows a perspective view of one of the two heat welding devices where the attachment of the devices to the main structure can be seen.

FIGS. 2 and 3 show the coupling of a heat welding device (3) to the main structure (1) by means of an adjustable fitting structure (4). FIG. 2 also shows the heat welding device (3), preferably a longitudinal support supported on a plurality of rolling means (6), preferably three cylindrical wheels preferably made of a soft material in order to not break the coverings (17) when passing over them and with the capacity to withstand temperatures of the order of 600-800° C., and also preferably comprising two heating elements (5) since the vehicle preferably circulates at a speed between about 2 and 4 km/h, thus preventing air loss. Said device (3) further comprises two pivoting means (15), preferably vertical longitudinal cylindrical parts located in a centered manner in a central support.

The two air heating elements (5) are preferably located close to the base of the device, preferably comprising height adjustment means (14).

Furthermore, the device also comprises conduction means (7) which are tubes conducting the air from ventilation means, preferably a fan (not depicted).

The lower portion of the structure (1) comprises a tamping means (9), preferably a tamping cylinder aligned with the heat welding device (3), which is held by two bars as can be seen in FIG. 2.

Figure 4:
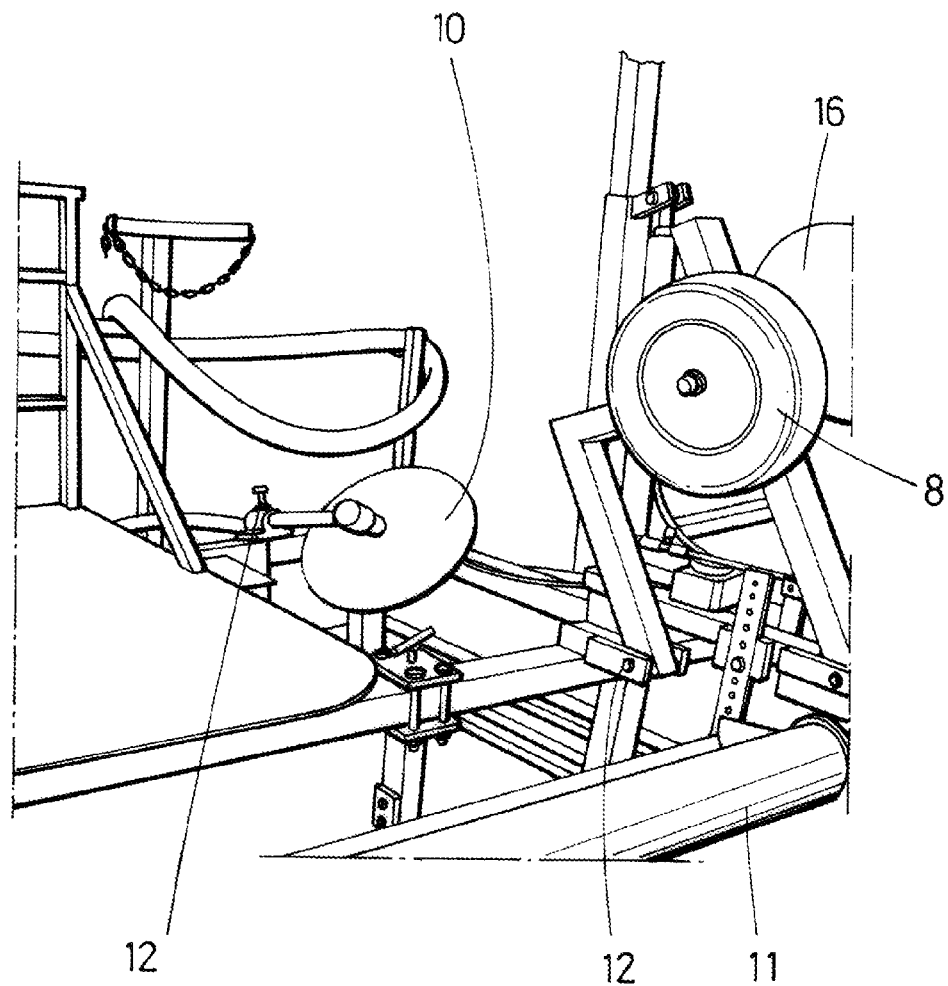
FIG. 4 shows a detailed view of the furrow opening means, the return means and the insertion means in a withdrawn position.

FIG. 4 shows the furrow opening means (10), preferably a circular plate, the insertion means (8), preferably a wheel, for inserting the edges of the coverings (17) into the furrows, as well as the return means (16) for returning the soil to the furrows and on the edges of the coverings (17) to hold them down on the terrain. Furthermore, the insertion means (8), the furrow opening means (10) and the return means (16) also preferably have swing means (12), preferably through bolts or screws.

Figure 5:
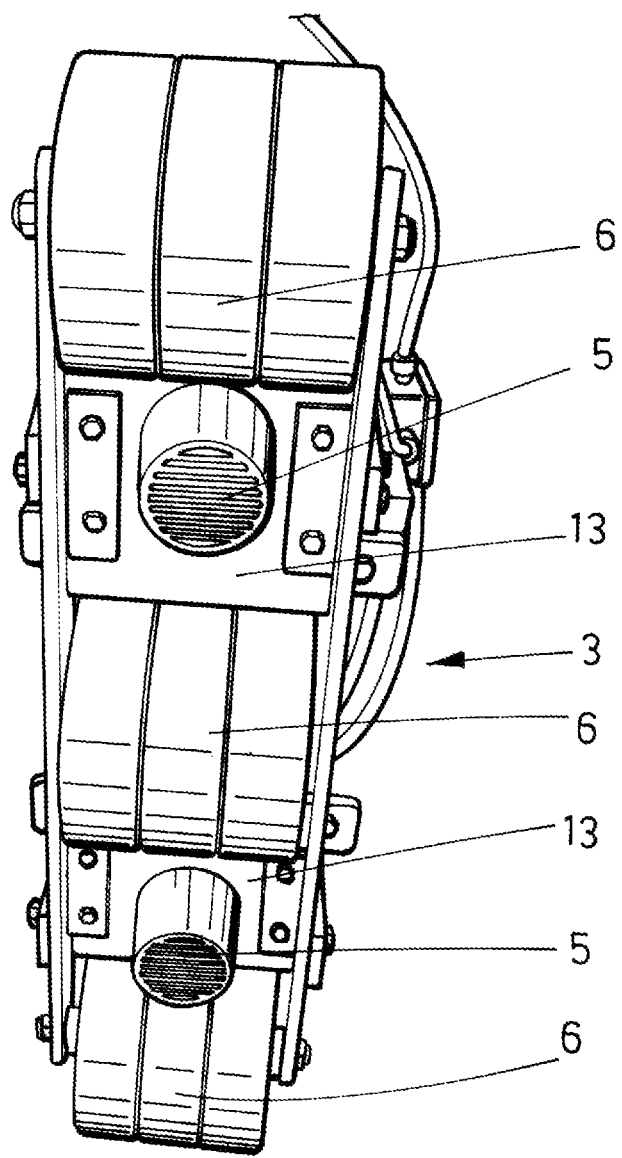
FIG. 5 shows a view of the lower portion of the heat welding device where the positioning of the air outlet openings of the heating elements for performing heat welding can be seen.

FIG. 5 also shows the lower portion of the device (3) preferably having coupled thereto the isolation means (13), preferably fluid isolation means made of fire-resistant elements or fabric to prevent hot air from leaking out when heat welding the coverings (17). Furthermore, as can be seen in the drawing, the air outlet opening for the air coming from the heating elements (5) are coupled a distance away from the lower surface of the wheels (15), such that there is a specific gap, preferably comprised between 10 and 30 millimeters from the ground, to perform the heat welding optimally.

Figure 6:
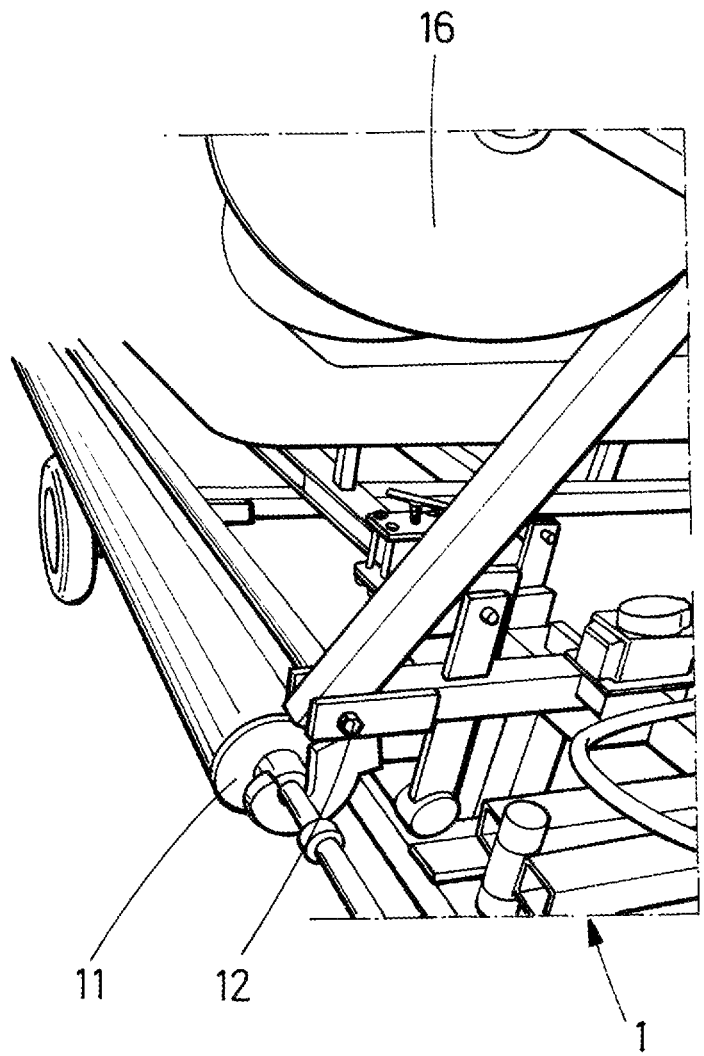
FIG. 6 shows a detailed view of the coating means.

Finally, FIG. 6 shows a detailed view of the coating means (11), preferably a longitudinal roller held by hooks on both outer sides of the structure (1), winding the covering (17), preferably a polymer covering, onto a reel.

The invention claimed is:

1. A heat welding system comprising a dispenser for dispensing coverings on a terrain and allowing the overlapped positioning thereof between adjacent coverings, comprising at least one structure with first coupling means which allow coupling said system to a traction vehicle, where said structure comprises at least one heat welding device allowing the overlapped longitudinal edges of adjacent coverings to adhere to one another on the ground, and having second coupling means which allow coupling said heat welding device to the structure and wherein the at least one heat welding device each comprise at least one heating element heating the air coming from a fan, and heating and applying or distributing the hot airflow on the overlapped section, a plurality of rolling means suitable for rolling over the longitudinal edges or sides of the overlapped coverings, and air conduction means through which the air from the fan circulates, wherein each of the at least one heating elements of the heat welding devices each comprise at least one pivoting means which allows compensating for terrain irregularities during the heat welding operation.

2. Heat welding system according to claim 1, wherein the structure comprises furrow opening means, return means, tamping means, insertion means and coating means.

3. Heat welding system according to claim 2, wherein the coating means comprise a reel of polymer material covering.

4. Heat welding system according to claim 2, wherein the furrow opening means, the return means, the insertion means and the at least one heat welding devices comprise swing means.

5. Heat welding system according to claim 2, wherein the furrow opening means and the return means each have a saucer-shaped section in at least one of their ends.

6. Heat welding system according to claim 1 comprising two heat welding devices where a first heat welding device is located in a first outer section of the structure and a second heat welding device is located in a second outer section of the structure.

7. Heat welding system according to claim 1, wherein the at least one heating elements is located separated from the lower surface of the rolling means where said surface contacts the ground.

8. Heat welding system according to claim 1, wherein the structure comprises at least one ventilation means connected to at least one heating element.

9. Heat welding system according to claim 1, wherein each at least one heat welding device comprises isolating means.

10. Heat welding system according to claim 9, wherein the isolating means are located in the space existing between the rolling means of each of the at least one heat welding devices.

11. A heat welding system comprising a dispenser for dispensing coverings on a terrain and allowing the overlapped positioning thereof between adjacent coverings, comprising at least one structure with first coupling means which allow coupling said system to a traction vehicle, where said structure comprises at least one heat welding device allowing the overlapped longitudinal edges of adjacent coverings to adhere to one another on the ground, and having second coupling means which allow coupling said heat welding device to the structure and wherein the at least one heat welding device each comprise at least one heating element heating the air coming from a fan, and heating and applying or distributing the hot airflow on the overlapped section, a plurality of rolling means suitable for rolling over the longitudinal edges or sides of the overlapped coverings, and air conduction means through which the air from the fan circulates, wherein the at least one heat welding device each comprise at least one height leveling means and one lateral movement means with respect to the structure.

12. A heat welding system comprising a dispenser for dispensing coverings on a terrain and allowing the overlapped positioning thereof between adjacent coverings, comprising at least one structure with first coupling means which allow coupling said system to a traction vehicle, where said structure comprises at least one heat welding device allowing the overlapped longitudinal edges of adjacent coverings to adhere to one another on the ground, and having second coupling means which allow coupling said heat welding device to the structure and wherein the at least one heat welding device each comprise at least one heating element heating the air coming from a fan, and heating and applying or distributing the hot airflow on the overlapped section, a plurality of rolling means suitable for rolling over the longitudinal edges or sides of the overlapped coverings, and air conduction means through which the air from the fan circulates, wherein the at least one heating element each comprise at least one height adjustment means.

13. Heat welding method comprising the steps of:
   (i) deploying furrow opening means, insertion means which allow inserting the edges of the coverings into the furrows and return means corresponding to a first and second side of the system for preparing a first covering on the ground, as well as unwinding said first covering arranged in coating means;
   (ii) starting the traction vehicle which pulls the system in one direction and initiating the system on the terrain, actuating the furrow opening means, insertion means, return means and coating means described in the preceding phase;
   (iii) after a first pass and the first section of the ground is covered by a covering duly extended thereon by means of phases (i) and (ii), vehicle movement is stopped, the means of phase (i) on the first side of the system are retracted except for the coating means, and a heat welding device comprising heating elements present on said first side is deployed, keeping the furrow opening means, insertion means, return means of the second side deployed;
   (iv) turning the traction vehicle, changing the direction of travel to that opposite the direction indicated in phase (ii), a second covering being extended adjacent to the first covering with the longitudinal edges of both coverings overlapping one another and the heat welding device described in phase (iii) acting on these coverings, while the furrow opening means, the insertion means for inserting the edges, and the return means act on the longitudinal edge opposite the first edge of said second covering which overlaps the edge of said first covering, leaving the longitudinal edge thereof prepared on the terrain;
   (v) repeating phases (iii) and (iv) as many times as necessary to extend and prepared coverings on the ground, adhering or sealing the longitudinal edges of as many adjacent coverings as required for the expanse of ground, intercalating the retraction and deployment of the heat welding devices and of the furrow opening means, insertion means for inserting the edges and the return means for preparing the coverings on the terrain arranged on the first and second side of the system.

14. Heat welding method according to claim 13, wherein step (v) comprises actuating the heat welding device arranged on the side opposite the heat welding device selected in steps (iii) and (iv).

15. Heat welding method according to claim 13, wherein steps (iii), (iv) or (v) comprise the step of feeding the heating elements through a fan.

* * * * *